3,109,710
PREPARATION OF BORON HYDRIDES
James L. Boone, Los Angeles, Calif., assignor to American Potash & Chemical Corporation, a corporation of Delaware
No Drawing. Filed Dec. 15, 1958, Ser. No. 780,258
3 Claims. (Cl. 23—204)

This invention relates in general to the preparation of hexaborane and pentaborane-9 and more particularly to the preparation of hexaborane and pentaborane-9 by the reaction of tetraborane or pentaborane-11 with $$[(CH_3)_2N]_2BH$$

It is an object of this invention to provide for the preparation of hexaborane and pentaborane-9 by the reaction of $B_5H_{11}$ or $B_4H_{10}$ with $[(CH_3)_2N]_2BH$.

Further objects and advantages of the invention, if not specifically set forth, will become apparent during the course of the description which follows.

Generally, it has been found that $B_4H_{10}$ and $B_5H_{11}$ may be converted to $B_6H_{10}$ and $B_5H_9$ by reaction with $[(CH_3)_2N]_2BH$ at relatively low temperature. The reagents conveniently may be mixed at —78° C., but reactions leading to volatile boranes are very slow under such conditions. Reasonable yields of these compounds are obtained during slow warming to 0° C.; and by suitable control of the time and temperature, the reactions can be effected in periods which are greatly reduced from those reported below. When either $B_4H_{10}$ or $B_5H_{11}$ are used, both $B_6H_{10}$ and $B_5H_9$ are obtained as products.

Examples of the process of this invention are set forth below for illustrative purposes, but these are not to be interpreted as imposing limitations on the scope of the invention other than as are set forth in the appended claims.

The $B_6H_{10}$ was identified by its M.P. (—66 to —65° C.; literature, —65.1), its vapor tension at 0° C. 7.3 mm.; literature, 7.2 mm.), its molecular weight (75.2; calcd. 74.9), and its complete hydrolysis to give 13.5 $H_2$ and 5.95 $B(OH)_3$ per $B_6H_{10}$ (calcd., 14.0 and 6.00).

EXAMPLE II

The partial conversion of $B_5H_{11}$ to $B_5H_9$ and $B_6H_{10}$ was carried out by the use of 1.88 mmoles of $B_5H_{11}$ (plus 0.130 mmole $B_5H_9$ impurity) with 0.748 mmole of $[(CH_3)_2N]_2BH$. After 17 hours at —78° C., the mixture was warmed to 0° C. during 9 hours. The products obtained are shown in Table B, vide infra, which table also includes the results of the secondary treatment of the non-volatile oily-gum residue with additional samples of $B_5H_{11}$. These secondary treatments show that the residue acts in a catalytic manner in converting successive samples of $B_5H_{11}$ to useful yields of $B_6H_{10}$. It therefore appears possible to accomplish a large amount of $B_5H_{11}$ conversion to $B_6H_{10}$ by means of a small amount of initially necessary $[(CH_3)_2N]_2BH$. Only in the first experiment of Table B was there any appreciable evolution of $H_2$ (0.045 mole).

As stated earlier, a convenient operating range is —78° C. (the temperature of a Dry Ice bath) to 0° C. However, higher temperatures may be suitable if proper control over reagent contact time is exercised. The maximum usable temperature is that at which the reagent $B_5H_{11}$, or the product $B_6H_{10}$, would decompose faster than it could be introduced or removed from the system.

The boron hydrides produced in this fashion are useful as pyrophoric fuel components and also may be used as reigniters in the event of jet flameouts.

Obviously, many modifications and variations may be made without departing from the spirit and scope of this invention, and therefore only such limitations should be imposed as are indicated in the appended claims.

Table B
PENTABORANE-11 CONVERSION

| Experiment No. | 1 | 2 | 3 | 4 | 5 |
|---|---|---|---|---|---|
| Treatment of residue from prior experiment | | 8 days at room temp.; volatiles removed. | Room temp., 27 days. | Left 3 days at 0° C. | Left 5 days at 0° C. |
| New $B_5H_{11}$ | 1.75 | 0.322 | 0.421 | 0.814 | 0.840. |
| Residue-$B_5H_{11}$ contact conditions | (See text) | Warmed from —78 to —20° C. in 6.5 hrs. | Warmed, —78 to —20° C., 4.0 hrs. | 6.5 hours at 0° C. | 3.0 hours at 0° C. |
| Percent $B_5H_{11}$ consumed | 100 | 93 | 34 | 98 | 69. |
| Yields of other boranes, given as percent B in $B_5H_{11}$ consumed: | | | | | |
| $B_2H_6$ | 11.1 | 22.1 | 25.4 | 32.8 | 34.4 |
| $B_4H_{10}$ | 18.9 | 31.0 | 19.7 | 14.9 | 11.6 |
| $B_5H_9$ [1] | 37.0 | 14.5 | 13.3 | 9.7 | 5.7 |
| $B_6H_{10}$ | 8.4 | 30.7 | 19.5 | 16.5 | 22.4 |
| $(CH_3)_2NB_2H_5$ | 4.1 | 1.9 | | | |
| Total | 79.5 | 100.2 | 78.0 | 74.0 | 74.0 |

[1] Corrected for $B_5H_9$ impurity in the $B_5H_{11}$ sample, the amount of which also was corrected for $B_5H_9$.

EXAMPLE I

A quantity of 2.17 mmoles of $B_4H_{10}$ was contacted with 1.897 mmoles of $[(CH_3)_2N]_2BH$ at —78° C. in vacuo and materials held at this temperature for 48 hours. Thereafter, the mixture was warmed to 0° C. during 10 hours, and the volatile components were distilled off. Measured in mmoles, with the percent yield based upon B in the unrecovered $B_4H_{10}$, results were as follows:

Table A

| | | | |
|---|---|---|---|
| $H_2$ | 0.031. | $B_5H_9$ | 0.425, 27.4%. |
| $B_2H_6$ | 0.183, 4.7%. | $B_6H_{10}$ | 0.087, 6.7%. |
| $B_4H_{10}$ | 0.228 (recovered). | $(CH_3)_2NB_2H_5$ | 0.125, 3.2%. |

I claim:
1. A process which comprises reacting $[(CH_3)_2N]_2BH$ with $B_4H_{10}$, said reaction being carried out for a period of time and at a temperature sufficient to form a reaction product mixture containing $B_6H_{10}$ and $B_5H_9$, said temperature being within the range of from —78° C. up to about 0° C., and then separating at least one of $B_6H_{10}$ and $B_5H_9$ from said reaction product mixture.

2. A process which comprises reacting $[(CH_3)_2N]_2BH$ with $B_4H_{10}$, said $B_4H_{10}$ being employed, relative to said $[(CH_3)_2N]_2BH$, in a molar ratio greater than one and said reaction being carried out for a period of time and at a temperature sufficient to form a reaction product mixture containing $B_6H_{10}$ and $B_5H_9$, said temperature being within the range of from $-78°$ C. up to about $0°$ C., and then separating at least one of $B_6H_{10}$ and $B_5H_9$ from said reaction product mixture.

3. A process which comprises reacting $[(CH_3)_2N]_2BH$ with $B_4H_{10}$, said reaction being carried out for a period of time and at a temperature sufficient to form a reaction product mixture containing $B_6H_{10}$ and $B_5H_9$, said temperature being within the range of from $-78°$ C. up to about $0°$ C., and then separating $B_6H_{10}$ from said reaction product mixture.

OTHER REFERENCES

Boone et al.: "Journal of the American Chemical Society," vol. 80, page 1519–1520 (Mar. 20, 1958).

Wiberg: "Berichte," vol. 77, part A, page 89 (1944).

Burg et al.: "Journal of the American Chemical Society," vol. 13, pages 953–957 (1951).

Burg et al.: "Journal of the American Chemical Society," vol. 55, page 4011–4012 (1933).

Burg: "Journal of the American Chemical Society," vol. 79, pages 2129–2132 (1957).

Stone: "Quarterly Reviews," vol. 9, page 193 (1955).